United States Patent [19]

Jonville et al.

[11] Patent Number: 5,013,503

[45] Date of Patent: May 7, 1991

[54] PROCESS FOR CONTINUOUS PRODUCTION OF CARBONACEOUS PASTE

[75] Inventors: Christian Jonville; Jean-Robert Nicollin, both of St. Jean-de-Maurienne, France

[73] Assignee: Aluminium Pechiney, Paris, France

[21] Appl. No.: 475,312

[22] Filed: Feb. 5, 1990

[30] Foreign Application Priority Data

Feb. 6, 1989 [FR] France ................................ 89 01917

[51] Int. Cl.$^5$ .............................................. B29C 67/02
[52] U.S. Cl. ...................... 264/117; 23/314; 106/284; 106/472; 252/502; 252/510; 264/105; 264/122; 264/349
[58] Field of Search ............... 264/104, 105, 117, 349, 264/122; 106/278, 281.1, 284, 273.1, 472; 252/510, 502; 23/313 R, 314

[56] References Cited

U.S. PATENT DOCUMENTS

| | | | |
|---|---|---|---|
| 3,618,903 | 11/1971 | Ronner et al. | 366/289 |
| 3,636,188 | 1/1972 | Driscoll | 264/117 |
| 3,687,628 | 8/1972 | Nelen et al. | 423/578 |
| 3,885,983 | 5/1975 | Bulit | 106/284 X |
| 4,428,679 | 1/1984 | Fischer et al. | 366/141 |

FOREIGN PATENT DOCUMENTS

| | | |
|---|---|---|
| 157987 | 10/1985 | European Pat. Off. . |
| 2038173 | 1/1971 | France . |
| 2039628 | 1/1971 | France . |
| 2154842 | 5/1973 | France . |
| 59-80322 | 5/1984 | Japan ................................ 264/117 |
| 515061 | 12/1971 | Switzerland . |
| 606498 | 10/1978 | Switzerland . |
| 650806 | 8/1985 | Switzerland ................................ 264/117 |

OTHER PUBLICATIONS

DeVries, L. French-English Science and Technology Dictionary, Fourth Edition (1976), p. 307.
English-Language Translation of Japanese Reference 59-80, 322 (Published May, 1984).
English-Language Translation of Swiss Reference 650,806, (Published Aug., 1985).

*Primary Examiner*—Leo B. Tentoni
*Attorney, Agent, or Firm*—Dennison, Meserole, Pollack & Scheiner

[57] ABSTRACT

A process for continuous production of a carbonaceous paste in which at least one carbonaceous aggregate and a cokable binder are introduced continuously into a kneader having an upstream end, a downstream end, and a rotating shaft associated with kneading elements. During the kneading operation, the paste, is passed from the upstream end to the downstream end of the kneader and is heated in the upstream end of the kneader. Water is injected into the paste in the downstream end of the kneader, causing a reduction in temperature of the paste and vaporization of the water, which is subsequently discharged from an orifice in the kneader. The paste reduced in temperature to a shaping temperature is continuously discharged from the downstream end of the kneader.

6 Claims, No Drawings

PROCESS FOR CONTINUOUS PRODUCTION OF CARBONACEOUS PASTE

BACKGROUND OF THE INVENTION

1. Field of the Invention

The invention concerns a process for the production of a carbonaceous paste based on at least one carbonaceous aggregate and a cokable organic binder. It essentially concerns adjusting the temperature of the paste to the particular conditions involved in shaping thereof as soon as it issues from the mixer.

2. Description of Related Art

Carbonaceous agglomerates are obtained by firing pieces which are shaped from a carbonaceous paste resulting from mixing of a cokable organic binder and a carbonaceous aggregate in the form of grains of graded sizes. Depending on the use to which the agglomerates are to be put, the nature of the binder (coal tar, petroleum tar, liquid or solid tar) and that of the carbonaceous grains (coal coke, petroleum coke, anthracite, etc.) may vary substantially but in all cases the procedure involves the stage of prolonged mixing between the binder and the carbonaceous grains (the granulometric distribution of which is carefully controlled), at a temperature such that the binder is sufficiently fluid (for example 140° C. to 180° C.) and for a period of time which ensures as perfect impregnation as possible by the binder of the carbonaceous grains. The quality of the electrodes (which is evaluated in particular by measuring geometrical density, electrical resistivity and resistance to crushing) after firing is closely linked to the effectiveness of the mixing operation.

In modern works for the production of carbonaceous pastes, as is the case in particular with the manufacture of anodes for the production of aluminum using the HALL-HEROULT process for the electrolysis of alumina in molten cryolite, the operation of mixing the blend of binder plus carbonaceous grains is carried out in a continuous mixing chain which comprises one or sometimes two mixers in series and the temperature of which is regulated at between 140° and 160° C. and which feeds a shaping installation using vibro-compacting.

One type of mixer which is currently in use is formed by a tubular body provided with fixed teeth which are inclined with respect to the axis of the tube, within which a shaft is moved with a reciprocating movement synchronized with a rotational movement, the shaft itself being provided with teeth co-operating with the fixed teeth in order to ensure that the carbonaceous paste is kneaded or worked and caused to flow along the arrangement. The fixed teeth are disposed along a helicoidal line and the amplitude of the backward and forward movement of the shaft is adjusted to the pitch at which the fixed teeth are disposed. The outlet of the mixer or mixers comprises a nozzle which is closed by motorised flap valves, while opening and closing of the valves can be regulated in dependence on thresholds in respect of instantaneous power in order to provide for satisfactory mixing of the paste and to prevent "jamming" or "stalling" of the apparatus, that is to say blocking thereof under load as a result of excessive filling thereof.

That type of mixer was described in particular in CH-A-515 061, CH No. 606 498 and FR-A-2 038 173 in the name of BUSS A.G. A process for regulating the mixing power thereof was described in European patent application EP-A-157 987 in the name of Aluminium Pechiney.

Mention may also be made of a second type of continuous mixer which is also very widely used, comprising two parallel agitators which rotate in opposite directions and which are disposed in side-by-side relationship in a casing of suitable shape. The main shaft carries radial discs which are themselves connected by mixing bars. In parallel to the shaft, the cleaning shaft which carries cleaning frame structures rotates at a ratio in respect of speed which is from 4 to 6 times higher. One or more retaining plates as well as one or more braking blades which are disposed on the body or the cover of the mixer, at the side of the cleaning shaft, make it possible to control the flow of paste within the apparatus. A mixer of that type was described in French patent application FR-A-2 039 628 = U.S. Pat. No. 3,687,628 in the name of H. LIST.

The man skilled in the art is aware from experience that in certain situations, for example that which involves shaping the anodes for Hall-Heroult electrolysis tanks, the optimum mixing and shaping temperatures do not coincide.

In order to provide for good penetration of the tar into the grains of coke and good homogeneity in respect of the carbonaceous paste, mixing must be carried out at about 160° C. while the shaping operation, for example using vibro-compacting, has to be performed at a substantially lower temperature (110° to 140° C.), as otherwise the agglomerates collapse far beyond the accepted dimensional tolerances after removal thereof from the mould and prior to the firing operation. It is therefore necessary for the mixed paste to be cooled by one to several tens of degrees prior to the shaping operation.

FR-2 154 842 (=U.S. Pat. No. 3,885,983) in the name of Aluminium Pechiney provides arranging two mixers in series. The paste which issues from the first mixer at a temperature of 150°/170° falls under the force of gravity into a vertical column which opens to the intake of the second mixer, the column being provided with controlled water spray means which effect controlled cooling of the paste to about 110°-115° C.

The disadvantage of that process is that it requires the use of two mixers and that the second mixer which operates on the cooled paste requires a much higher level of power by virtue of the increased viscosity of the carbonaceous paste when it has been cooled in that way.

SUMMARY OF THE INVENTION

The underlying concept of the invention comprises introducing a cooling fluid at a suitably selected point on the mixer in such a way that the major part of the mixing operation is effected at the optimum temperature Th and concluding the mixing operation while effecting cooling of the paste which issues from the mixer at a temperature Tb which is lower than Th and which is the optimum temperature for the shaping operation which follows. For the sake of clarity of this description, it will be appropriate to use the expression upstream zone of the mixer (with reference to the direction of forward movement of the paste) to identify the part of the mixer which is provided with a controlled means for heating the paste to the temperature Th, and to use the expression downstream zone to designate the part of the mixer which is without a heating means (or at least in which, if there is a heating means, it has been previously taken out of operation) and in which the cooling fluid, which will normally be water, is introduced.

More precisely, the invention concerns a process for the production of a carbonaceous paste which is intended to be shaped at a temperature Tb close to the discharge from a tubular mixer, into which at least one carbonaceous aggregate and a cokable organic binder are continuously introduced, the mixer comprising means for advancing the paste from the intake towards the outlet associated with mixing means disposed along at least one shaft which is driven in rotation, the mixer comprising an upstream zone provided with means for heating the paste to a temperature Th higher than Tb and a downstream zone which opens at the discharge orifice for the carbonaceous paste.

The process provides that, during the mixing operation, water is injected through at least one orifice which is disposed in the downstream zone of the mixer. On coming into contact with the paste the water vaporizes and is then continuously discharged from the mixer by way of a suitable orifice. However it was quickly found that, quite unexpectedly, that introduction of water into the downstream zone of the mixer caused a substantial reduction in the power required for the mixing effect, whereas logic would have indicated that the result would have been an increase, due to the increase in viscosity of the cooled paste. Correlatively, the hourly flow rate from the mixer increases in a proportion which can be up to 50%, while the quality of the carbonaceous products produced from the pastes which are obtained in that way is at least equal to that of the pastes obtained in an uncooled mixer.

DESCRIPTION OF THE PREFERRED EMBODIMENTS

The injection of water into the mixer can be effected in different ways, either by way of at least one orifice provided in the side wall of the mixer, or through the main shaft which carries the movable teeth, in which case that shaft is hollow and is provided with orifices which open into the mixer, or preferably by way of at least one of the fixed teeth.

It is possible to provide one or more injection orifices which are optionally provided with nozzles that produce a spray effect for the water. It will be appreciated that it is essential to provide an orifice for discharge of the water vapor, the discharge orifice generally being disposed at the end of the mixer in the vicinity of the orifice for discharge of the carbonaceous paste.

The position of the point at which water is introduced into the downstream zone of the reactor, or the point which in that zone is disposed at the most upstream location if the arrangement has a plurality of points at which water is introduced, is to be such that at least half of the mixing work is carried out at the "high" temperature Th.

The injection of water is effected into the downstream zone at a point which can be disposed between the intake of that zone and a position at approximately halfway along its length, going in a downstream direction.

The man skilled in the art will determine the optimum position for that point and also the water flow rate in dependence on the difference between Th and Tb and the type of mixer used, bearing in mind that, for practical reasons, it is preferable not to provide for the injection of water into the upstream zone of the reactor which comprises the means for heating the carbonaceous paste.

When the mixer has a plurality of water injection points, that remark applies to the point which is disposed at the most upstream position.

The amount of water to be injected can be theoretically calculated from the hourly flow rate of paste, the $\Delta t$ between the high temperature Th and the low temperature Tb, the specific heat of the carbonaceous paste, the temperature of the injected water and its heat of vaporization.

In practice it is found that the optimum water flow rate is between 1 and 10 liters of water per ton of carbonaceous paste, for a $\Delta t$ of the order of from 10° to 60° C.

EXAMPLE

The invention was carried into effect using a BUSS mixer with a nominal flow rate of 18 tons per hour of a carbonaceous paste comprising 86% of carbonaceous aggregate and 14% of coal tar.

The mixing temperature Th which was generally between 120° and 180° C. was regulated to 160° C. and the water flow rate was regulated in such a way as to obtain a paste discharge temperature Tb equal to 144°±2° C. and corresponded to 18 liters of water per hour, that is to say 1 liter per ton and per hour.

The injection of water was effected through one of the fixed teeth which is disposed substantially in the middle of the mixing zone.

In the course of a series of tests, the water flow rate was varied between 20 and 150 liters per hour (therefore for 18 tons of paste). The temperature Tb varied from 140°±2° C. to 110°±2° C., being the usual temperature for effecting vibro-compacting of the carbonaceous paste.

It was found that:

(1) the mean power supplied by the motor of the mixer (which was powered with direct current) could be reduced from 150 to 80 kW for the same paste flow rate, by virtue of the injection of water;

(2) with the level of mean power maintained, and with the same configuration in respect of the mixer (speed, position of the valves), the paste flow rate was increased during the period of the tests from 12 to 18 tons per hour; and (3) the quality tests carried out on the anodes produced (apparent specific gravity, electrical conductivity, resistance to cracking due to thermal shock) gave practically identical results with or without the injection of water.

The tests under actual conditions of use on electrolysis tanks confirmed those results.

Besides a substantial gain in regard to the amount of energy consumed by the mixing operation and/or in regard to the flow rate of the mixer, use of the invention makes it possible substantially to reduce the level of capital investment required to produce carbonaceous paste as it is only necessary to have a single mixer to produce perfectly mixed paste at the optimum temperature for the shaping operation, for example using vibro-compacting.

What is claimed is:

1. A process for the continuous production of a carbonaceous paste to be shaped, comprising the steps of:
    continuously introducing into a kneader having an upstream end, a downstream end, and a rotating shaft associated with kneading elements, at least one carbonaceous aggregate and a cokable binder, and kneading to form a carbonaceous paste;

passing said paste from said upstream end to said downstream end, during kneading;

heating said paste in the upstream end of said kneader to a temperature Th;

injecting water into the paste in the downstream end of said kneader, causing a reduction in temperature of the paste and vaporization of the water;

discharging the vaporized water from an orifice in the kneader; and continuously discharging from the downstream end of said kneader, the paste reduced in temperature to a shaping temperature Tb below Th.

2. A process according to claim 1, wherein the temperature Tb is between 110° and 140° C.

3. A process according to claim 1, wherein the temperature Th is between 120° and 180° C.

4. A process according to claim 1, 2 or 3, wherein the flow rate of water injected into the mixer per ton of carbonaceous paste is between 1 and 10 liters per hour.

5. A process according to claim 1, wherein the water is sprayed onto the paste in said injecting step.

6. A process according to claim 1, wherein the water is injected into the paste at a plurality of points in said downstream end.

* * * * *